United States Patent
Fahlenkamp et al.

(10) Patent No.: US 9,525,354 B2
(45) Date of Patent: Dec. 20, 2016

(54) SWITCHING MODE POWER SUPPLY WITH BURST MODE

(71) Applicant: Infineon Technologies Austria AG, Villach (AT)

(72) Inventors: Marc Fahlenkamp, Geretsried (DE); Josef Neulinger, Petershausen (DE)

(73) Assignee: Infineon Technologies Austria AG, Villach (AT)

( * ) Notice: Subject to any disclaimer, the term of this patent is extended or adjusted under 35 U.S.C. 154(b) by 152 days.

(21) Appl. No.: 14/600,816

(22) Filed: Jan. 20, 2015

(65) Prior Publication Data
US 2015/0249390 A1 Sep. 3, 2015

Related U.S. Application Data

(60) Provisional application No. 61/947,089, filed on Mar. 3, 2014.

(51) Int. Cl.
*H02M 3/335* (2006.01)
*H02M 1/00* (2006.01)

(52) U.S. Cl.
CPC . *H02M 3/33507* (2013.01); *H02M 2001/0035* (2013.01); *H02M 2001/0054* (2013.01); *Y02B 70/1491* (2013.01); *Y02B 70/16* (2013.01)

(58) Field of Classification Search
CPC .................... H02M 2001/0035; H02M 3/335; Y02B 70/16
See application file for complete search history.

(56) References Cited

U.S. PATENT DOCUMENTS

| | | | |
|---|---|---|---|
| 7,394,669 B2 | 7/2008 | Fahlenkamp et al. | |
| 2006/0093017 A1* | 5/2006 | Gong | H02M 3/33507 375/134 |
| 2010/0188061 A1* | 7/2010 | Ma | H02M 3/158 323/247 |
| 2013/0308791 A1* | 11/2013 | Yang | H04B 15/005 381/94.5 |

* cited by examiner

*Primary Examiner* — Harry Behm
(74) *Attorney, Agent, or Firm* — Shumaker & Sieffert, P.A.

(57) ABSTRACT

A method of operating a power supply having a transformer, a transistor controlling the current through a primary side of the transformer, and a control unit for controlling the switching of the transistor to generate current pulses in the transformer, is suggested, the method comprising receiving a feedback signal, and exiting a burst mode and entering a normal mode based on the feedback signal in case the feedback signal exceeds a first threshold value or in case the feedback signal exceeds a second threshold value for at least a first amount of time and in case the feedback signal exceeds a third threshold value, wherein the third threshold value is larger than the second threshold value and the first threshold value is larger than the third threshold value.

17 Claims, 4 Drawing Sheets

SWITCHING MODE POWER SUPPLY WITH BURST MODE

This application claims the benefit of U.S. Provisional Application No. 61/947,089, filed on Mar. 3, 2014, the entire content of which is incorporated herein by reference.

TECHNICAL FIELD

Embodiments of the present invention relate to switching mode power supplies (SMPSs), and in particular to a control circuit for a SMPS, to a SMPS itself, to an apparatus powered by and incorporating the SMPS and to methods performed by the SMPS and the control circuit.

SUMMARY

A first embodiment relates to a method of operating a power supply having a transformer, a transistor controlling the current through a primary side of the transformer, and a control unit for controlling the switching of the transistor to generate current pulses in the transformer, the method comprising
    receiving a feedback signal, and
    exiting a burst mode and entering a normal mode based on the feedback signal
        in case the feedback signal exceeds a first threshold value
        or in case the feedback signal exceeds a second threshold value for at least a first amount of time and in case the feedback signal exceeds a third threshold value,
        wherein the third threshold value is larger than the second threshold value and the first threshold value is larger than the third threshold value.

A second embodiment relates to a device comprising
    a transformer,
    a transistor controlling a current through a primary side of the transformer,
    a control unit for controlling the switching of the transistor to generate current pulses in the transformer,
    wherein the control unit is configured
        to receive a feedback signal,
        to exit a burst mode and to enter a normal mode based on the feedback signal
            in case the feedback signal exceeds a first threshold value
            or in case the feedback signal exceeds a second threshold value for at least a first amount of time and in case the feedback signal exceeds a third threshold value,
            wherein the third threshold value is larger than the second threshold value and the first threshold value is larger than the third threshold value.

A third embodiment relates to a device comprising
    a transformer,
    a transistor controlling a current through a primary side of the transformer,
    a control unit for controlling the switching of the transistor to generate current pulses in the transformer,
    wherein the control unit comprises
        means for receiving a feedback signal,
        means for exiting a burst mode and entering a normal mode based on the feedback signal
            in case the feedback signal exceeds a first threshold value
            or in case the feedback signal exceeds a second threshold value for at least a first amount of time and in case the feedback signal exceeds a third threshold value,
            wherein the third threshold value is larger than the second threshold value and the first threshold value is larger than the third threshold value.

A forth embodiment is directed to a computer program product directly loadable into a memory of a digital processing device, comprising software code portions for performing the steps of:
    receiving a feedback signal, and
    exiting a burst mode and entering a normal mode based on the feedback signal
        in case the feedback signal exceeds a first threshold value
        or in case the feedback signal exceeds a second threshold value for at least a first amount of time and in case the feedback signal exceeds a third threshold value,
        wherein the third threshold value is larger than the second threshold value and the first threshold value is larger than the third threshold value.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Figure 1:
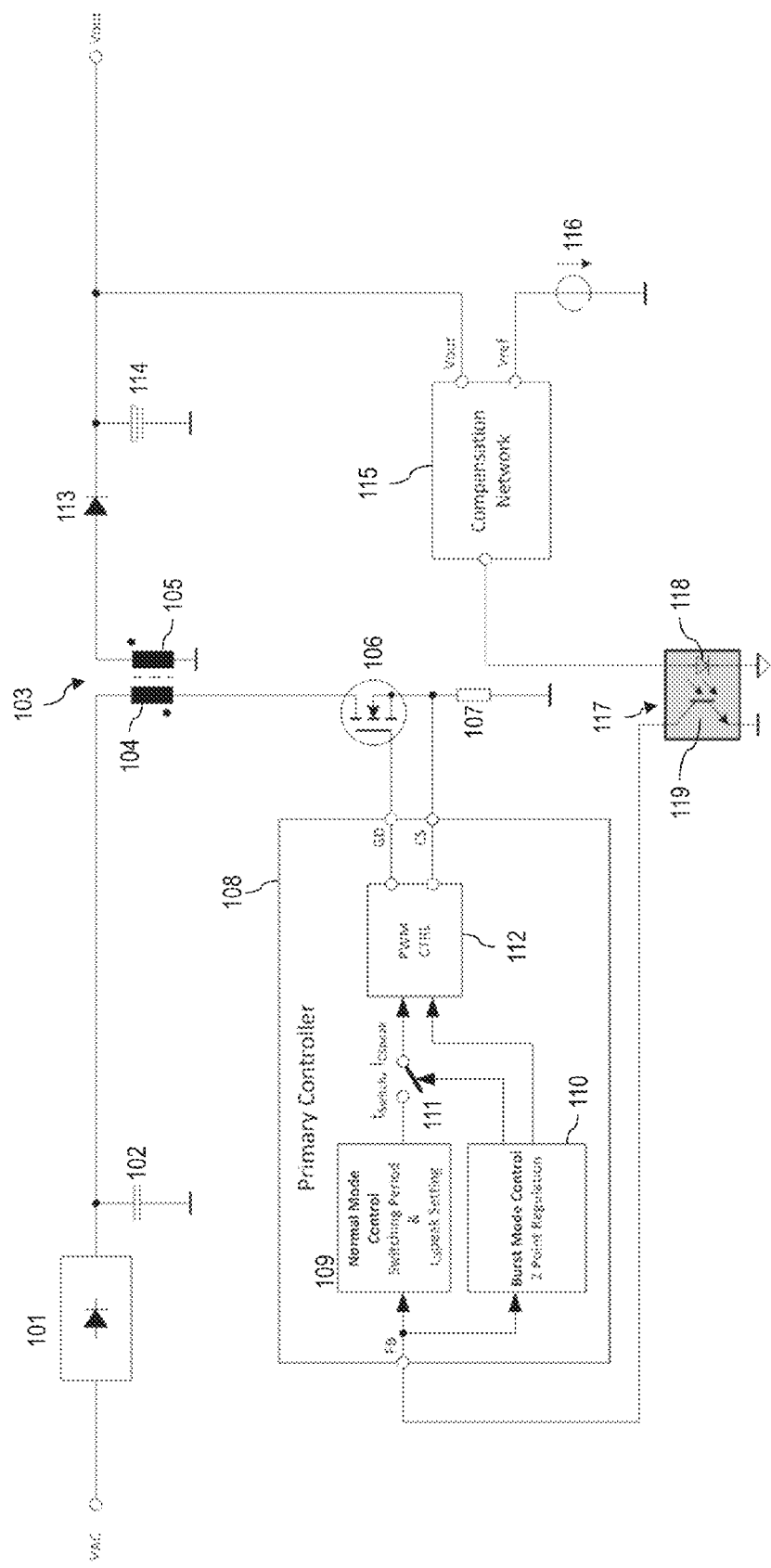
FIG. 1 shows a schematic block diagram of a power converter.

Switching mode power supplies (SPMSs) are being increasingly used in many domestic and industrial applications. Apparatuses such as televisions or computer monitors operate in one of a number of states or modes. For example, a first "off" mode occurs when there is no power being supplied to the apparatus; a second "on" mode occurs when the device is switched on and is operating normally; and a third mode, referred to as a "standby mode", occurs when the device is to remain powered but with reduced functions and reduced power consumption. In the case that the apparatus is a television, for example, the standby mode may, for example, be a mode in which the television is not displaying a picture or producing sound, but certain circuitry in the television may remain powered so that, if the "on" button of the remote control is pressed the television is able to return to the "on" mode.

An SMPS may be implemented by supplying a regulated power supply to the primary side of a transformer that is in series with a transistor. The secondary side of the transformer is connected to the apparatus (also referred to as "load"). Switching of the transistor (usually, but not exclusively, switching off of the transistor; so called "fly-back" operation) causes variations in the current through the transformer, resulting in an output power on the secondary side of the transformer. The secondary side of the transformer may be connected via a smoothing circuit to the apparatus to be powered. The average number of switching operations per unit time, and the current caused to flow in the transistor in each switching operation, together determine the average power transmitted to the apparatus. The main advantage of the SMPS in comparison to conventional power supplies built up by means of linear regulators is its high efficiency at full load.

However, when the load decreases and the switching cycle remains the same, the efficiency of the SMPS decreases tremendously, since power losses are almost entirely due to the switching losses, which in turn are almost exactly proportional to the number of switching operations the transistor performs. A known solution to this problem is to reduce the number of switching operations per unit time as the load falls, such that the average number of switching operations is sufficient to supply the load. Since the number of switching operations is reduced, the switching losses decrease as the load is reduced.

There are several known methods for controlling the timing of the switching operations. A solution is to maintain the frequency of the switching operations at the same value irrespective of whether the device is operating in high or low power mode, but in the low power mode to interrupt the switching operations. Thus, in this "burst mode" there are "bursts" ("frames") of high frequency power pulses separated by periods in which there are no power pulses at all. The average power transmitted thus depends upon the proportion of the operation of the SMPS for which the bursts are transmitted.

U.S. Pat. No. 7,394,669 B2 refers in particular to SMPSs and allows determining the duty cycle and the frequency of a burst mode only from a feedback signal which contains the load information from the SMPS. A difference between the two threshold values gives a hysteresis, which removes high frequency bursting. U.S. Pat. No. 7,394,669 B2 is herewith incorporated by reference.

FIG. 1 shows a schematic block diagram of a power converter. An AC voltage supply VAC is received at the left of the figure. Typically, the VAC may be in the range between 85V to 270V. The VAC is rectified by a rectifier 101, and then passed to a smoothing capacitor 102. The DC voltage supplied by the rectifier 101 is fed to one input of a primary winding 104 of a transformer 103. The primary winding 104 is connected in series with a transistor 106. The transistor 106 can be any electronic switching element that can be used in a power converter. In the example shown in FIG. 1, the transistor 106 is an n-channel MOSFET, wherein the drain of the MOSFET is connected to the primary winding 104 and the source of the MOSFET is connected via a resistor 107 to ground.

FIG. 1 also shows a primary controller 108 comprising a normal mode control 109, a burst mode control 110, a switch 111 and a PWM control 112 (PWM: pulse width modulation). The gate of the MOSFET is controlled by an output GD (gate driver) of the primary control 108, which is controlled by the PWM control 112. The source of the MOSFET is connected to an input CS (current sense), which is supplied to the PWM control 112. Via the input CS, the current flowing through the resistor 107 is sensed.

A secondary winding 105 of the transformer 103 is connected via a diode 113 to an output providing a DC voltage output Vout. This output is further connected via a capacitor 114 to ground. The DC voltage output Vout is also fed to a compensation network 115, to which also a reference voltage signal Vref is supplied by a voltage source 116. An output signal of the compensation network 115 is supplied to a light emitting diode 118 of an optocoupler 117. A current through the light emitting diode 118 is detected by a light sensitive element 119, which is connected between ground and a signal input FB (FB: feedback) of the primary controller 108.

The compensation network 115 allows comparing the DC voltage output Vout with the reference voltage signal Vref, wherein the result conveyed to the light emitting diode 118 indicates a difference between those two DC voltages Vout and Vref.

The signal input FB of the primary controller 108 is connected to the normal mode control 109 and to the burst mode control 110. The normal mode control 109 controls the PWM control 112 by supplying a switching period $t_{switch}$ and a current peak $I_{CSpeak}$ of the switching current. If the primary controller 108 operates in burst mode, the burst mode control 110 opens the switch 111, determines the switching frequency and the current and controls the PWM control 112. In such case, the burst mode control 110 applies a two-point regulation. If the primary controller 108 operates in normal mode, the burst mode control 110 closes the switch 111 and the normal mode control 109 controls the PWM control 112.

Figure 2:
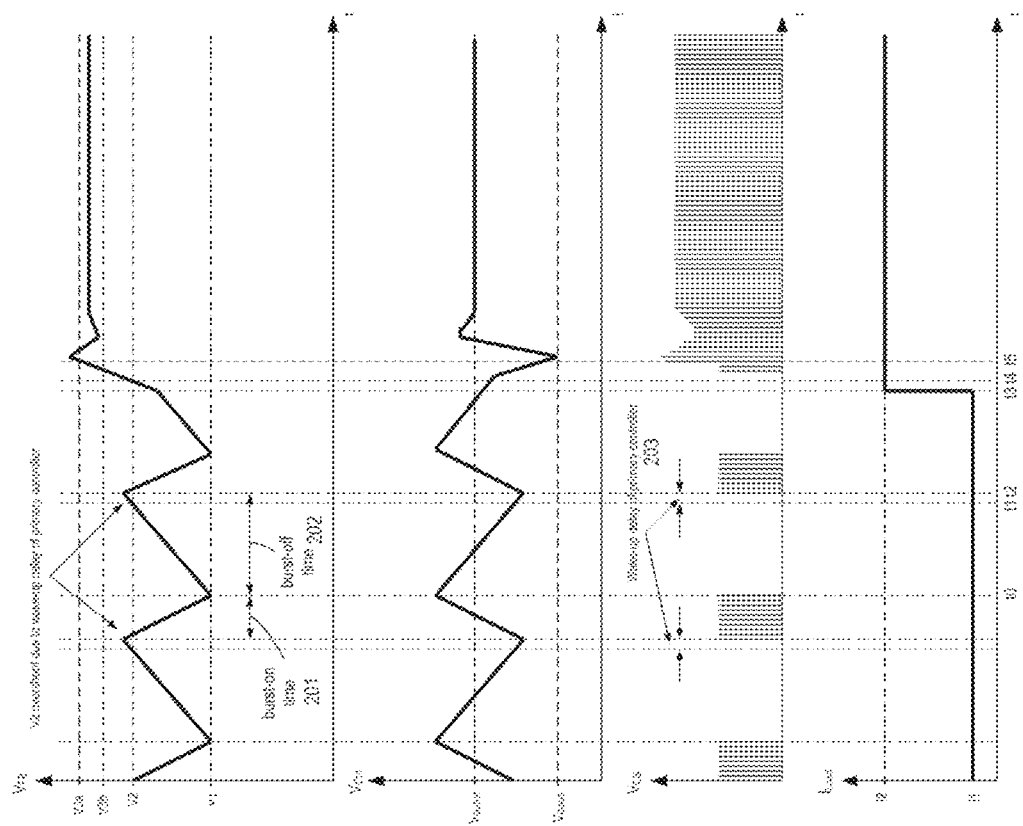
FIG. 2 shows an exemplary diagram comprising several signals and a load-jump from a low to a high current that results in ending a bust mode and entering a normal mode of a primary controller.

FIG. 2 shows an exemplary signal diagram comprising a voltage $V_{FB}$ at the signal input FB, the DC voltage output $V_{Out}$ (Vout in FIG. 1), a voltage $V_{CS}$ at the input CS and a current $I_{Load}$ supplied to a load connected to the power converter. All signals are depicted over a time t.

At first, the output load is low and requires a low current I1. The primary controller 108 is in burst mode having a burst-on phase 201 and a burst-off phase 202. A period of the burst mode comprises the burst-on phase 201, the burst-off phase 202 and a time 203 which corresponds to a wake-up delay caused by the primary controller 108.

In case the voltage $V_{FB}$ reaches a lower threshold V1 (see, e.g., at a time t0), the primary controller 108 may enter a standby-mode, the burst-off phase 202 starts and lasts until a time t1 is reached. At the time t1, the voltage $V_{FB}$ reaches an upper threshold V2, which triggers the primary controller 108 to wake up. Such wake-up is completed at a time t2 and at this time t2 the burst-on phase 201 begins again. The voltage $V_{CS}$ shows exemplary pulses during the burst-on phase and no pulses during burst-off phases.

As can be seen from the ramps of the voltage $V_{FB}$ and the DC voltage output $V_{Out}$, if the primary controller provides a two-point regulation in burst mode, i.e. a regulation between the thresholds V1 and V2. During the burst-on phase, energy is conveyed towards the load, which is also visualized by the rising ramp of the DC voltage output $V_{Out}$ and during the burst-off phase, no energy is conveyed towards the load (indicated by the falling ramp of the DC voltage output $V_{Out}$). However, when in burst-mode, the DC voltage output $V_{Out}$ may oscillate around a voltage $V_{OutRef}$, which may correspond to the reference voltage signal Vref shown in FIG. 1.

In the example shown in FIG. 2, at a time t3, the output load current jumps from the low current I1 to a high current I2, which may correspond to an apparatus (e.g., TV) being switched on. In this high load situation the burst mode would not suffice to convey the required amount of energy towards the load. The load-jump occurs at the time t3, at a time t4, the voltage $V_{FB}$ reaches the upper threshold V2, the primary controller 108 wakes up, the burst-on phase begins. At a time t5, a threshold V3a is reached, the primary controller 108 recognizes that the burst mode is no longer suitable, exits the burst mode and enters the normal mode. By applying the normal mode, the primary controller 108 (via the normal mode control 109) is able to control the transistor 106 by adjusting the switching period $t_{switch}$ and the current peak $I_{CSpeak}$ of the switching current in a flexible manner to convey a suitable (high) amount of energy towards the load and to counter an unwanted voltage drop of the DC voltage output $V_{Out}$. As is exemplarily shown in FIG. 2, the voltage drop of the DC voltage output $V_{Out}$ is compensated from a low level $V_{OutUS}$ to the reference voltage level $V_{OutRef}$. Accordingly, the voltage $V_{FB}$ reaches a steady state below the threshold V3a.

In FIG. 2 an additional threshold V3b is shown for the voltage $V_{FB}$. This threshold V3b becomes active for comparison purposes in case a predetermined time limit $t_{SWO}$ is reached or exceeded after the voltage $V_{FB}$ has reached the threshold V2. This may be an additional criterion to also enter the burst mode as will be exemplarily shown and explained hereinafter in particular with regard to FIG. 3.

Figure 3:
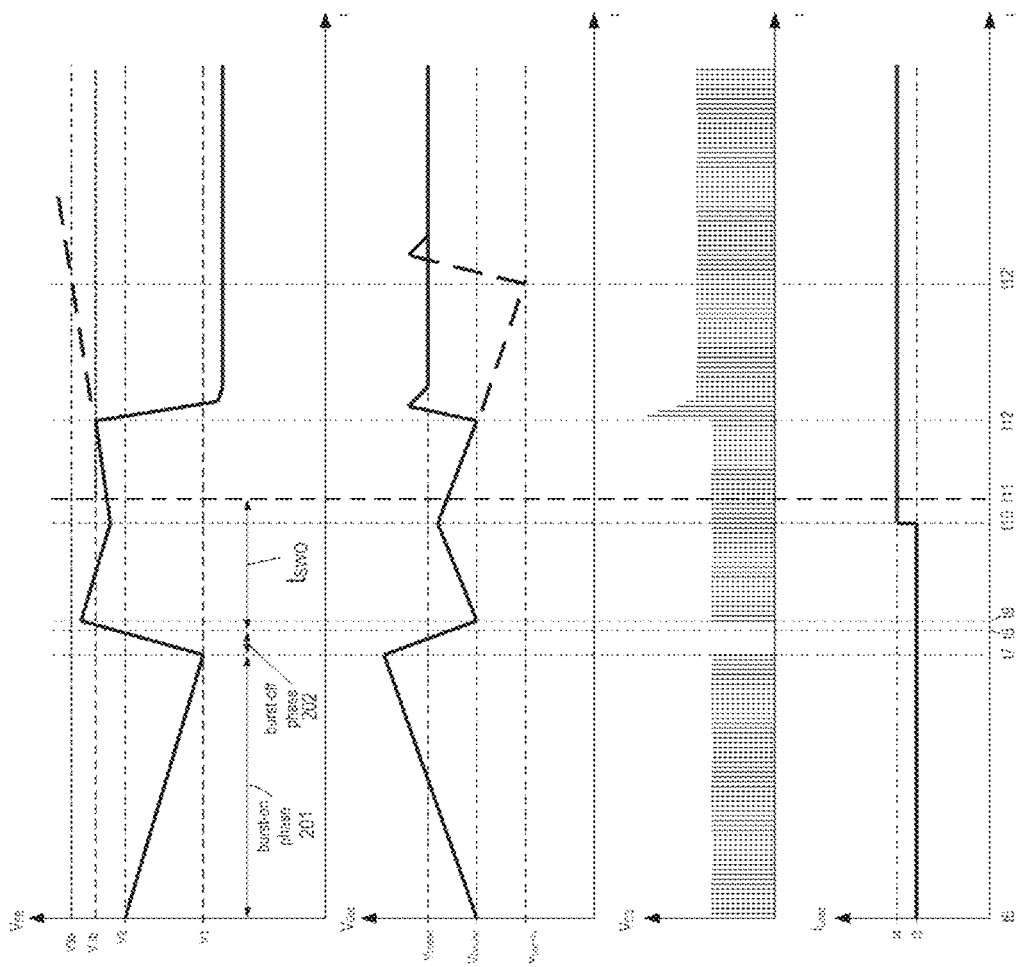
FIG. 3 shows an alternative diagram comprising several signals and a small load-jump that results in ending a bust mode and entering a normal mode of a primary controller.

FIG. 3 shows an exemplary signal diagram comprising the voltage $V_{FB}$ at the signal input FB, the DC voltage output $V_{Out}$ (Vout in FIG. 1), the voltage $V_{CS}$ at the input CS and the current $I_{Load}$ supplied to a load connected to the power converter in case of a small load-jump indicated by a load current increasing from a current I3 to a current I4 at a time t10. All signals are depicted over a time t.

In this example, the threshold V3b in combination with the time limit $t_{SWO}$ is used to determine a criterion to exit the burst mode and to enter the normal mode.

In the example shown in FIG. 3, at a time t6 the primary controller 108 is in burst mode. A burst-one phase 201 starts at the time t6 and lasts until a time t7. The voltage $V_{CS}$ indicates the pulses that are conveyed during the burst-on phase 201. At the time t6, the voltage $V_{FB}$ reaches the upper threshold V2 and at the time t7, the voltage $V_{FB}$ reaches the lower threshold V1. At this time t7, a burst-off phase 202 begins, the voltage $V_{FB}$ rises and reaches the upper threshold V2 at a time t8. The primary controller 108 is re-activated (wake-up as described with regard to FIG. 2 above), which takes some time until a time t9 and leads to an overshoot of the threshold V3b before the burst-on phase 201 is active (i.e. after the time t9) and the voltage $V_{FB}$ starts falling again.

When reaching the threshold V2 at the time t8, a starting point for the predetermined time limit $t_{SWO}$ is triggered, which results in an ending point at a time t11. At this time t11, the burst mode exit threshold is changed from the threshold V3a to the threshold V3b. Hence, the predetermined time limit $t_{SWO}$ defines a time when the burst mode exit threshold is changed, in particular reduced to a lower value.

As indicated, a small jump of the load current from the current I3 to the current I4 occurs at the time t10. This small load jump occurs during a burst-on phase and leads to an increase of the voltage $V_{FB}$. Hence, due to the load-jump, the energy conveyed in the burst mode towards the load does not suffice. As indicated above, after the time t11, the burst mode exit threshold is reduced from the threshold V3a to the threshold V3b. The increasing voltage $V_{FB}$ reaches the threshold V3b at a time t12. Hence, the primary controller 108 exits the burst mode and enters the normal mode at this time t12.

By applying the normal mode, the primary controller 108 (via the normal mode control 109) is able to control the transistor 106 by adjusting the switching period $t_{switch}$ and the current peak $I_{CSpeak}$ of the switching current in a flexible manner to convey a suitable (high) amount of energy towards the load and to counter an unwanted voltage drop of the DC voltage output $V_{Out}$ below a voltage $V_{OutUS1}$.

In case the threshold V3a would have been used instead of the threshold V3b, the burst mode would have been exited at a time t12', which would have resulted in a larger voltage undershoot $V_{OutUS2}$. This would have required stronger compensating countermeasures, which could impact the compensation network dimensioning for ensuring a suitable loop stability over the load range.

If the voltage $V_{FB}$ falls below a predetermined threshold (not shown), e.g., below the threshold V1, the normal mode may be exited and the burst mode may be re-entered. In such case, the higher burst mode exit threshold V3a may be re-activated at the re-start of the burst mode.

Hence, the second threshold V3b may be used as an additional criterion to leave the burst mode and enter the normal mode at an early stage to efficiently avoid that the DC voltage output $V_{Out}$ experiences a high undershoot. This is in particular beneficial in cases when small load jumps occur in particular close at the exit from the burst mode to the normal mode, i.e. when the burst mode is close to its capability of providing a sufficient amount of energy towards the load.

As an example, additional exit thresholds $V3_i$ (i=1, . . . , n) can be used, wherein a predetermined time limit $t_{SWOi}$ can be (e.g. individually) set, e.g., for each additional exit threshold $V3_i$. In this regard, the exit thresholds $V3_i$ may build a predefined curve, e.g., lie on a graph of or defined by an exponential function.

Figure 4:
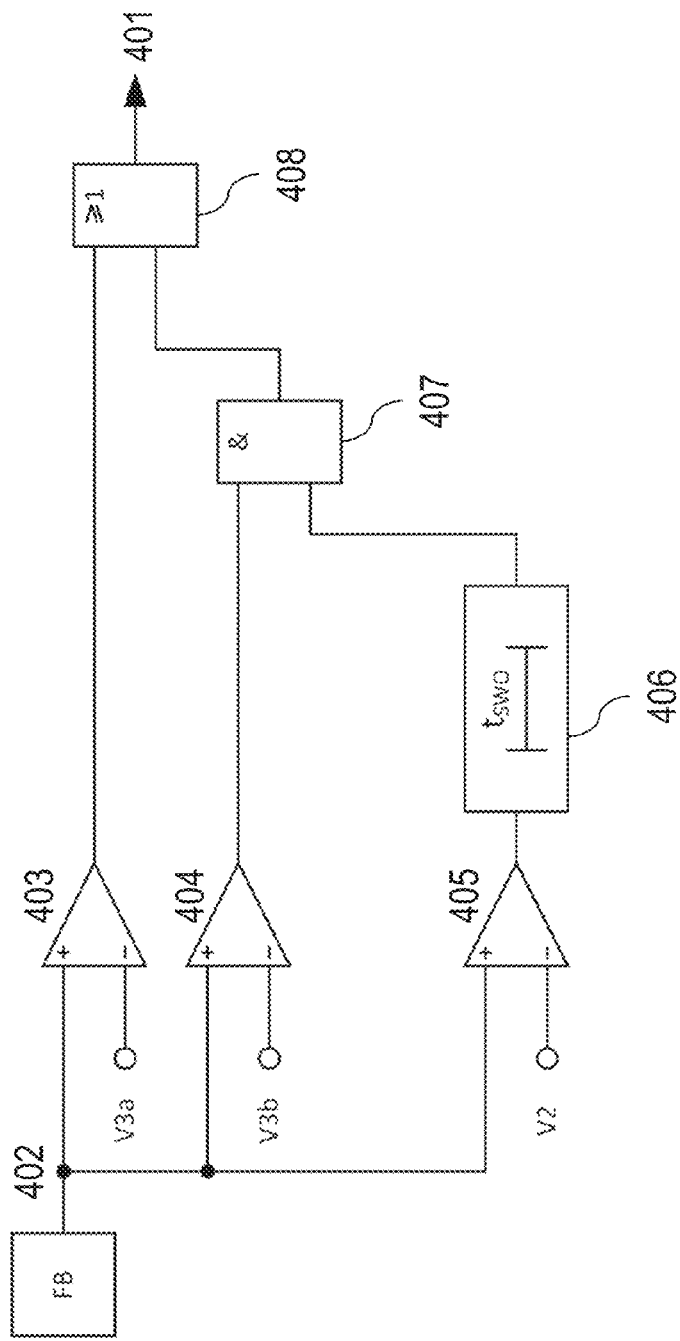
FIG. 4 shows an exemplary logic that may be used within the burst mode control to determine a signal, which indicates a transition from the burst mode to the normal mode.

FIG. 4 shows an exemplary logic that may be used within the burst mode control 110 to determine a signal 401, which indicates a transition from the burst mode to the normal mode.

As indicated in FIG. 1, the input FB of the primary controller 108 is fed to the burst mode control 110 and further to a node 402. The node 402 is connected to a positive input of a comparator 403, the negative input of the comparator 403 is supplied with the threshold V3a. The node 402 is also connected to a positive input of a comparator 404, the negative input of the comparator 404 is supplied with the threshold V3b. The node 402 is further connected to a positive input of a comparator 405, the negative input of the comparator 405 is supplied with the threshold V2.

The output of the comparator 403 indicates that the voltage $V_{FB}$ reaches or exceeds the voltage of the threshold V3a (e.g., via a logic "1"). The output of the comparator 403 is connected to the first input of an OR gate 408.

The output of the comparator 404 indicates that the voltage $V_{FB}$ reaches or exceeds the voltage of the threshold V3b (e.g., via a logic "1"). The output of the comparator 404 is connected to the first input of an AND gate 407.

The output of the comparator 405 indicates that the voltage $V_{FB}$ reaches or exceeds the voltage of the threshold V2 (e.g., via a logic "1"). The output of the comparator 405 is connected to a unit 406, which indicates at its output (e.g., via a logic "1") that the voltage $V_{FB}$ has reached or exceeded the voltage of the threshold V2 for at least a time $t_{SWO}$. The output of the unit 406 is connected to the second input of the AND gate 407.

The output of the AND gate 407 is connected to the second input of the OR gate 408. The output of the OR gate 408 supplies the signal 401.

Hence, the burst mode ends and the normal mode is entered in case the signal 401 indicates a logic "1". This happens in case the voltage $V_{FB}$ reaches or exceeds the threshold V3$a$;

or in case the voltage $V_{FB}$ reaches or exceeds the threshold V3$b$ and has exceeded the threshold V2 for at least the time $t_{SWO}$.

In case of additional exit thresholds V3$_i$ (i=1, ..., n) being used, individual time limits $t_{SWOi}$ can be set via several units similar to the unit 406. A time offset may be based on the time when the threshold V2 or when any preceding threshold V3$_{i-1}$ has been reached. It is in particular noted that the exit thresholds V3$_i$ may be arranged in a decreasing sequence, i.e. each subsequent threshold V3$_{i+1}$ may indicate a smaller voltage compared to the actual threshold V3$_i$. Based on the time offset that may be individually set for each of the exit thresholds V3$_i$, various graphs or curves could be implemented.

The examples suggested herein may in particular be based on at least one of the following solutions. In particular combinations of the following features could be utilized in order to reach a desired result. The features of the method could be combined with any feature(s) of the device, apparatus or system or vice versa.

A method is suggested of operating a power supply having a transformer, a transistor controlling the current through a primary side of the transformer, and a control unit for controlling the switching of the transistor to generate current pulses in the transformer, the method comprising
receiving a feedback signal, and
exiting a burst mode and entering a normal mode based on the feedback signal
in case the feedback signal exceeds a first threshold value
or in case the feedback signal exceeds a second threshold value for at least a first amount of time and in case the feedback signal exceeds a third threshold value,
wherein the third threshold value is larger than the second threshold value and the first threshold value is larger than the third threshold value.

The first threshold value may correspond to the threshold V3$a$, the second threshold value may correspond to the threshold V2 and the third threshold value may correspond to the threshold V3$b$ according to FIG. 2 and FIG. 3.

The control unit may be referred to as primary controller. The feedback signal may be provided from the secondary side of the transformer via a DC-isolated unit, e.g., an optocoupler.

The transistor may comprise at least one electronic switching element, e.g., bipolar transistor, MOSFET, IGBT or the like.

In an embodiment, the feedback signal is indicative of a current through the primary side of the transformer.

In an embodiment, the feedback signal relates to a power drawn by a load from a secondary side of the transformer.

In an embodiment, the second threshold value corresponds to an upper limit of a range that substantially determines a two-point regulation of the burst mode.

When in burst mode, the control unit may operate between two thresholds (a lower threshold and an upper threshold), wherein the upper threshold is determined by the second threshold value. The burst mode comprises a duration when no pulses are generated in the transformer. During this off-phase, the feedback signal goes from the lower threshold to (substantially) the upper threshold of the two thresholds. It may slightly exceed the upper threshold due to the fact that the control unit may have to be re-activated.

In an embodiment, the normal mode is ended and the burst mode is re-entered in case the feedback signal falls below a forth threshold value, wherein the forth threshold value corresponds to or is below a lower limit of the range that substantially determined the two-point regulation.

In an embodiment, the first threshold value and the third threshold value are defined by a predefined function over time.

Hence, setting the first and third threshold values over time may correspond to a curve of a graph that may be determined by a predefined function, e.g., an exponential function. In this regard, additional threshold values may be provided that may define conditions for exiting the burst mode and for entering the normal mode.

In an embodiment, the method further comprises:
exiting the burst mode and entering the normal mode based on the feedback signal
in case the feedback signal exceeds the second threshold value for at least a second amount of time and in case the feedback signal exceeds a fifth threshold value,
wherein the third threshold value is larger than the fifth threshold value.

Hence, a multitude of conditions may be used to determine whether the burst mode is to be exited and the normal mode is to be entered.

As an example, additional exit thresholds V3$_i$ (i=1, ..., n) can be used, wherein a predetermined time limit $t_{SWOi}$ can be (e.g. individually) set, e.g., for each additional exit threshold V3$_i$. In this regard, the exit thresholds V3$_i$ may be part of a predefined curve, e.g., lie on a graph of or defined by an exponential function.

Also, a device is provided, the device comprising
a transformer,
a transistor controlling a current through a primary side of the transformer,
a control unit for controlling the switching of the transistor to generate current pulses in the transformer,
wherein the control unit is configured
to receive a feedback signal,
to exit a burst mode and to enter a normal mode based on the feedback signal
in case the feedback signal exceeds a first threshold value
or in case the feedback signal exceeds a second threshold value for at least a first amount of time and in case the feedback signal exceeds a third threshold value,
wherein the third threshold value is larger than the second threshold value and the first threshold value is larger than the third threshold value.

In an embodiment, the device is a switching mode power supply.

In an embodiment, the control unit is arranged on a single chip or die.

In an embodiment, the control unit is a single integrated device.

In an embodiment, the control is coupled to a DC-isolated unit for receiving the feedback signal that is based on a current drawn from a secondary side of the transformer.

In an embodiment, the DC-isolated unit is an optocoupler.

In an embodiment, the control unit is configured to exit the burst mode and to enter the normal mode based on the feedback signal
in case the feedback signal exceeds the second threshold value for at least a second amount of time and in case the feedback signal exceeds a fifth threshold value,
wherein the third threshold value is larger than the fifth threshold value.

A device is suggested, the device comprising
a transformer,
a transistor controlling a current through a primary side of the transformer,
a control unit for controlling the switching of the transistor to generate current pulses in the transformer,
wherein the control unit comprises
means for receiving a feedback signal,
means for exiting a burst mode and entering a normal mode based on the feedback signal
in case the feedback signal exceeds a first threshold value
or in case the feedback signal exceeds a second threshold value for at least a first amount of time and in case the feedback signal exceeds a third threshold value,
wherein the third threshold value is larger than the second threshold value and the first threshold value is larger than the third threshold value.

A computer program product is suggested, which is directly loadable into a memory of a digital processing device, comprising software code portions for performing the steps of:
receiving a feedback signal, and
exiting a burst mode and entering a normal mode based on the feedback signal
in case the feedback signal exceeds a first threshold value
or in case the feedback signal exceeds a second threshold value for at least a first amount of time and in case the feedback signal exceeds a third threshold value,
wherein the third threshold value is larger than the second threshold value and the first threshold value is larger than the third threshold value.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method of operating a power supply that includes a transformer, a transistor controlling the current through a primary side of the transformer, and a control unit for controlling the switching of the transistor to generate current pulses in the transformer, the method comprising
receiving a feedback signal, and
exiting a burst mode and entering a normal mode based on the feedback signal
in case the feedback signal exceeds a first threshold value
or in case the feedback signal exceeds a second threshold value for at least a first amount of time and in case the feedback signal exceeds a third threshold value,
wherein the third threshold value is larger than the second threshold value and the first threshold value is larger than the third threshold value.

2. The method according to claim 1, wherein the feedback signal is indicative of a current through the primary side of the transformer.

3. The method according to claim 1, wherein the feedback signal relates to a power drawn by a load from a secondary side of the transformer.

4. The method according to claim 1, wherein the second threshold value corresponds to an upper limit of a range that substantially determines a two-point regulation of the burst mode.

5. The method according to claim 4, wherein the normal mode is ended and the burst mode is re-entered in case the feedback signal falls below a fourth threshold value, wherein the forth threshold value corresponds to or is below a lower limit of the range that substantially determined the two-point regulation.

6. The method according to claim 1, wherein the first threshold value and the third threshold value are defined by a predefined function over time.

7. The method according to claim 1, further comprising:
exiting the burst mode and entering the normal mode based on the feedback signal
in case the feedback signal exceeds the second threshold value for at least a second amount of time and in case the feedback signal exceeds a fifth threshold value,
wherein the third threshold value is larger than the fifth threshold value.

8. A device comprising
a transformer,
a transistor controlling a current through a primary side of the transformer,
a control unit for controlling the switching of the transistor to generate current pulses in the transformer,
wherein the control unit is configured
to receive a feedback signal,
to exit a burst mode and to enter a normal mode based on the feedback signal
in case the feedback signal exceeds a first threshold value
or in case the feedback signal exceeds a second threshold value for at least a first amount of time and in case the feedback signal exceeds a third threshold value,
wherein the third threshold value is larger than the second threshold value and the first threshold value is larger than the third threshold value.

9. The device according to claim 8, wherein the device is a switching mode power supply.

10. The device according to claim 8, wherein the control unit is arranged on a single chip or die.

11. The device according to claim 8, wherein the control unit is a single integrated device.

12. The device according to claim 8, wherein the control is coupled to a DC-isolated unit for receiving the feedback signal that is based on a current drawn from a secondary side of the transformer.

13. The device according to claim 12, wherein the DC-isolated unit is an optocoupler.

14. The device according to claim 8, wherein the control unit is configured
to exit the burst mode and to enter the normal mode based on the feedback signal
in case the feedback signal exceeds the second threshold value for at least a second amount of time and in case the feedback signal exceeds a fifth threshold value,
wherein the third threshold value is larger than the fifth threshold value.

15. A device comprising
a transformer,
a transistor controlling a current through a primary side of the transformer,
a control unit for controlling the switching of the transistor to generate current pulses in the transformer,
wherein the control unit comprises
means for receiving a feedback signal,
means for exiting a burst mode and entering a normal mode based on the feedback signal
in case the feedback signal exceeds a first threshold value
or in case the feedback signal exceeds a second threshold value for at least a first amount of time and in case the feedback signal exceeds a third threshold value,
wherein the third threshold value is larger than the second threshold value and the first threshold value is larger than the third threshold value.

16. A computer program product directly loadable into a memory of a digital processing device, comprising software code portions for performing the steps of:
receiving a feedback signal, and
exiting a burst mode and entering a normal mode based on the feedback signal
in case the feedback signal exceeds a first threshold value
or in case the feedback signal exceeds a second threshold value for at least a first amount of time and in case the feedback signal exceeds a third threshold value,
wherein the third threshold value is larger than the second threshold value and the first threshold value is larger than the third threshold value.

17. A computer readable medium comprising instructions that upon execution by one or more processor cause the one or more processors to:
upon receiving a feedback signal,
exit a burst mode and enter a normal mode based on the feedback signal
in case the feedback signal exceeds a first threshold value or in case the feedback signal exceeds a second threshold value for at least a first amount of time and in case the feedback signal exceeds a third threshold value,
wherein the third threshold value is larger than the second threshold value and the first threshold value is larger than the third threshold value.

* * * * *